United States Patent [19]

Cavanagh, Jr. et al.

[11] Patent Number: 4,621,997
[45] Date of Patent: Nov. 11, 1986

[54] WAFER DIE CONSTRUCTION

[75] Inventors: John F. Cavanagh, Jr., Matunuck; Paul A. Cavanagh, No. Scituate, both of R.I.

[73] Assignee: Cavanagh & Sons, Inc., Greenville, R.I.

[21] Appl. No.: 778,781

[22] Filed: Sep. 23, 1985

[51] Int. Cl.$^4$ ............ A21C 5/00; A21C 11/04; A21C 11/08; A21C 11/10
[52] U.S. Cl. .................... 425/299; 425/385; 425/394
[58] Field of Search ................ 425/298–299, 425/385, 394; 264/284; 99/353; 426/497

[56] References Cited

U.S. PATENT DOCUMENTS

| | | | |
|---|---|---|---|
| 3,520,248 | 7/1970 | MacKendrick | 99/355 |
| 4,062,918 | 12/1977 | Nakanose | 264/284 |
| 4,352,831 | 10/1982 | Cavanagh et al. | 426/502 |

Primary Examiner—Willard E. Hoag
Attorney, Agent, or Firm—Barlow & Barlow, Ltd.

[57] ABSTRACT

An apparatus for manufacturing wafers is disclosed that includes a pair of rolls each containing cavities that form the wafers. The cavities each have outer edge walls that extend from the bottom portion of the cavity at an obtuse angle and the two rolls are arranged so that the cavities become effectively mirror images of each other as they engage at the nip. The cavities also have portions rising from the bottom thereof that impress a design substantially equal from both sides to proclude warping of the bread.

3 Claims, 7 Drawing Figures

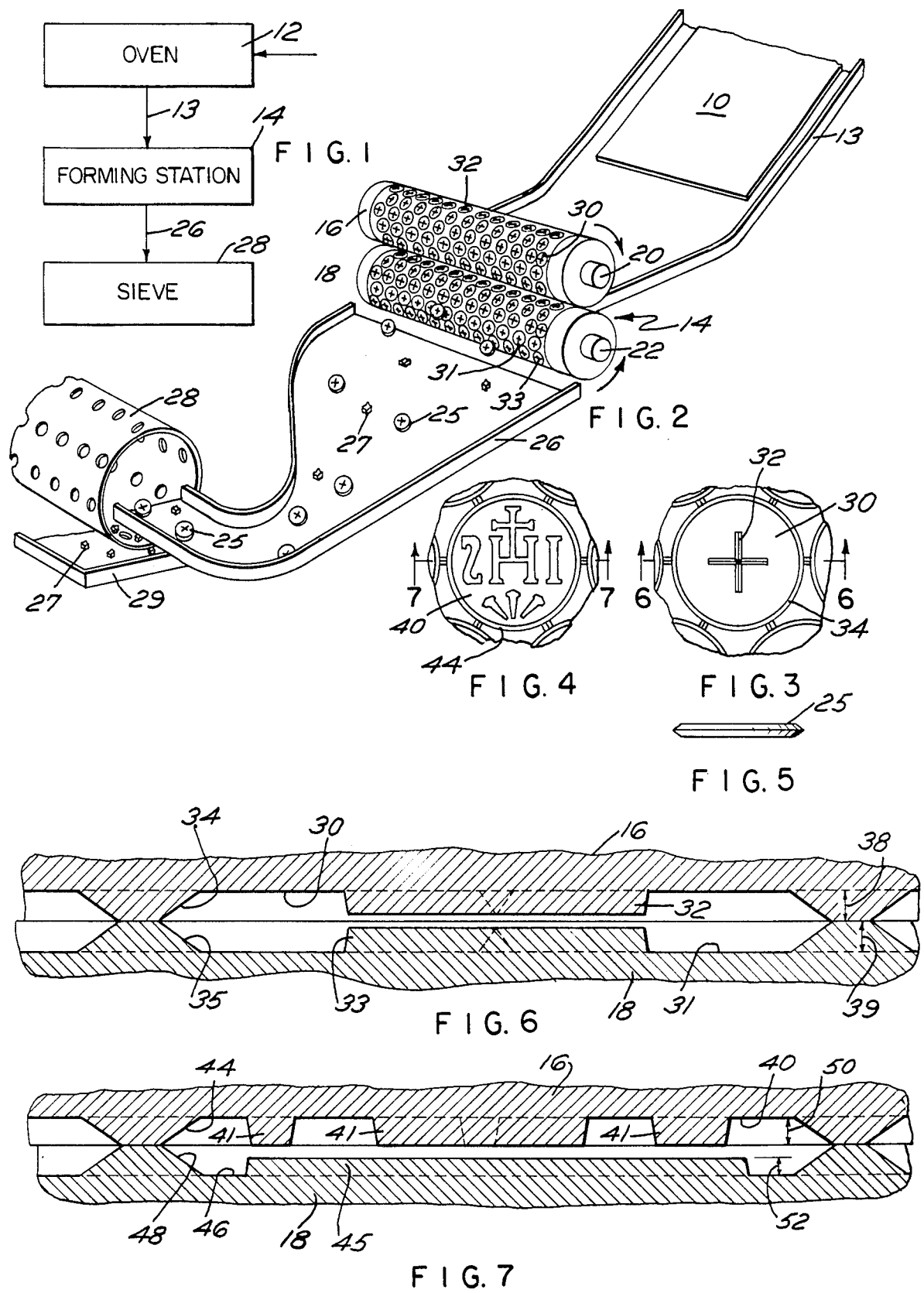

WAFER DIE CONSTRUCTION

BACKGROUND OF THE INVENTION

The present invention relates to a wafer forming die and more particularly to a drum type die for the manufacture of communion wafers from a sheet of bread.

High volume production of wafers necessitates the use of a revolving drum provided with a plurality of die inserts which cut shape and possibly configurate the face of a wafer in a rapid and continuous fashion from a relatively continuous sheet of bread. In the past each revolving cylindrical die cooperated with a cylindrical pressure roller as seen in our previous U.S. Pat. No. 4,446,476. It has been found particuarly when designs are impressed into the wafers that the wafers assume a slightly dome shape due to the unequal pressures that are exerted on either side of the bread. The warpage is possibly due to the fact that the bread when it is cut is effectively unleavened bread that has been baked and it is believed that the center being softer and porous yields quite readily under pressure.

SUMMARY OF THE INVENTION

An improved apparatus is provided for continuously manufacturing wafers at high speed and which will turn out wafers in substantially flat form. In accordance with the present invention, sheets of unleavened bread each having fryable outer crust and a center which is rather soft and porous are advanced to the wafer forming station where each sheet is succesively advanced through a nip defined between two wafer cutting rolls, each of which contains cutting die and which mate at the nip thereof. Each of the forming rolls has at least one cavity, and these cavities are of a general uniform depth so that the total depth of the two mating cavities is substantially equal to the thickness of the sheet of bread. When a simple design such as a cross is impressed into the bread, rising from the bottom wall of each cavity will be a former that will impress a design equally from both sides. In some configurations where a complicated design is desired, it has been found equally advantageous to utilize merely a solid presser that will rise from the bottom of the wall of one cavity while the design appears rising from the wall of the opposite cavity. After the wafers have been cut they will drop under the force of gravity to a receiving station where the wafers may be separated from the unusable pieces cut from the sheet of bread.

BRIEF DESCRIPTION OF THE DRAWING

FIG. 1 is block diagram illustrating the continuous process for the manufacture of wafers;

FIG. 2 is a perspective view illustrating the apparatus for developing sheets of bread to the wafer forming dies and thence to the residue separation station;

FIG. 3 is a detailed view of one form of wafer cutting cavity;

FIG. 4 is a similar view showing another form of cavity;

FIG. 5 is an elevational view of the wafer manufactured in accordance with the method in apparatus of this invention;

FIG. 6 is an enlarged view in section showing diagramatically the developed surfaces and the manner in which the two opposing dies come together for the design of FIG. 3; and, FIG. 7 is a similar view diagramatically illustrating the developed surfaces of the dies forming the pattern of FIG. 4.

DESCRIPTION OF THE PREFERRED EMODIMENT

Referring first to FIGS. 1 and 2 of the drawing, sheets of bread which may be unleavened bread of the type that forms wafers used in the Eucharist, will come from an oven 12 and be delivered via a chute 13 to a forming station 14 that includes a pair of forming rolls 16 and 18. Each of the rolls are of the same diameter and are mounted respectively on shafts 20 and 22 that are driven at the same speed in the direction shown by the arrows. The shafts are carried in suitable support bearings that are adjustable so that the shafts may be moved toward and away from each other to provide the proper cutting action on the bread. As the sheets of bread 10 are carried through the nip between the roll 16 and 18, each sheet is cut into wafers such as 25 with remnants 27 breaking away from the formed wafers. The wafers 25 and the remnants 27 fall into a chute 26 and slide therealong into a rotating sieve 28 where the remants 27 are separated out from the wafers 25 by falling through the holes in the sieve and into a scrap tray 29.

It will be observed generally from FIG. 2 that each of the rolls 16 and 18 is provided with a series of cavities which cut the wafers from the sheet of bread. Referring now to FIGS. 3 through 7, the cavities essentially are depressions in the surface of the rolls and have a bottom wall such as 30 and will have a raised former portion such as 32 which may be generally triangular in shape to provide a design and will terminate with a tapered side wall 34. The opposite cavity is substantially a mirror image with a bottom wall 31, a raised former section 33 and a tapered edge wall 35. It should be understood when referring to FIG. 6, for example, that FIG. 6 is effectively a surface development of a portion of the rolls which are curved, but for illustrated purposes have been projected as if we have two dies coming together on a horizontal plane. As the sheet of bread 10 enters the nip between the rolls 16 and 18, the bread will have nominally a dimension equal to the sum of the depth of the cavities on each of the dies represented by the depths designated 38 and 39 in FIG. 6. For example, in the illustrative design of FIG. 3, if the bread has a thickness of 0.07, each of the dimensions 38 and 39 is 0.035 and the depth of the design impressed by each former 32 and 33 will be 0.03 from the bottom wall of the cavity. It will be seen, therefore, that the impression is equal from both sides to prevent warping of the bread.

Referring now to FIGS. 4 and 7, a slightly different form of cavity is provided for impressing a more detailed design. To this end, the dies on opposing rolls are not formed as mirror images of each other, but rather the cavity on the upper roll 16, has a bottom wall 40 with a plurality of raised former portions such as 41 to impress the design, each of which raised former portions has sloping side walls and extend for a distance 50 from the bottom wall 40. As in the previous embodiment the side walls 44 of the cavity are tapered. The lower die roll 18 in this particular instance has a cavity with a bottom wall 46 and tapering side walls 48 and rising from the bottom wall is a panel 45 that rises from the bottom wall by a distance indicated at 52. For sake of illustration let us assume in English units of measurement that the cavities have equal depth so that the cavity 50 will have a depth of let us say 0.025 and the raised panel 45 will have a dimension of 0.015 leaving a distance between the raised panel and the design impressing portions of 0.01.

The basic feature of the present invention is the ability to impress each wafer as it is being formed without having any warping occurring as a result of equal pressures being exerted upon the wafer.

We claim:

1. In an apparatus for manufacturing wafers having rotatable forming rolls opposing each other, each forming roll defining at least one cavity below the surface of the roll, said at least one cavity having an outer edge wall extending from the bottom portion of the cavity at an obtuse angle, forming tapered edges surrounding each said cavity, each said cavity in a first of said rolls being aligned such as to form a cooperating die pair with one said cavity of a second of said rolls, means for guiding a sheet of bread between said rolls, means for rotating said rolls in unison, said rolls pressing a sheet of bread between each said die pair to form a wafer from the sheet of bread, said tapered edges cutting the wafer from said sheet of bread, each of said rolls defining means within each said cavity to impress into the bread substantially equally from both sides to proclude warping of the bread.

2. An apparatus as in claim 1 wherein one cavity of a first roll has a raised central portion and the corresponding cavity of the second roll has a raised design.

3. An apparatus as in claim 1 wherein each said cavity of each said roll have raised designs opposing each other.

* * * * *